US012732399B2

(12) United States Patent
Han et al.

(10) Patent No.: US 12,732,399 B2
(45) Date of Patent: Sep. 8, 2026

(54) TRANSMITTER COMPRISING FEED FORWARD EQUALIZER

(71) Applicant: IUCF-HYU (INDUSTRY-UNIVERSITY COOPERATION FOUNDATION HANYANG UNIVERSITY), Seoul (KR)

(72) Inventors: Jae Duk Han, Seoul (KR); Wook Jin Shin, Seoul (KR); Hyeong Min Seo, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 0 days.

(21) Appl. No.: 18/853,209

(22) PCT Filed: Mar. 30, 2023

(86) PCT No.: PCT/KR2023/004322
§ 371 (c)(1),
(2) Date: Oct. 1, 2024

(87) PCT Pub. No.: WO2023/191565
PCT Pub. Date: Oct. 5, 2023

(65) Prior Publication Data

US 2025/0254070 A1 Aug. 7, 2025

(30) Foreign Application Priority Data

Apr. 1, 2022 (KR) ........................ 10-2022-0040923

(51) Int. Cl.
*H04L 25/03* (2006.01)
*H04L 25/02* (2006.01)

(52) U.S. Cl.
CPC .... *H04L 25/03019* (2013.01); *H04L 25/0272* (2013.01); *H04L 25/0274* (2013.01); *H04L 25/0276* (2013.01)

(58) Field of Classification Search
CPC ... H04B 1/38; H04B 3/04; H04B 3/06; H04B 3/462; H04L 25/0262; H04L 25/0264;
(Continued)

(56) References Cited

U.S. PATENT DOCUMENTS 8,363,707 B2 * 1/2013 Hollis .................... G09G 5/006 455/283
8,626,474 B2 * 1/2014 Li .......................... G06F 30/20 703/2

(Continued)

FOREIGN PATENT DOCUMENTS

KR 10-2006-0089553 A 8/2006
KR 10-2257233 B1 5/2021

(Continued)

OTHER PUBLICATIONS

International Search Report for PCT/KR2023/004322 dated Jun. 8, 2023 (PCT/ISA/210).

*Primary Examiner* — Young T. Tse
(74) *Attorney, Agent, or Firm* — Sughrue Mion, PLLC

(57) ABSTRACT

A transmitter comprising a feed forward equalizer according to an embodiment of present invention comprises a delay unit receiving an input signal and generating at least one delay signal, a transition detection filter generating an input data information based on the input signal and the at least one delay signal, a transition information for the input signal and the at least one delay signal, and a common mode balancing information for the transition information and a voltage driver outputting a differential transmission signal
(Continued)

based on the input data information, the transition information, and the common mode balancing information.

10 Claims, 10 Drawing Sheets

(58) Field of Classification Search
CPC ............. H04L 25/0272; H04L 25/0274; H04L 25/0276; H04L 25/03; H04L 25/03019
USPC ....... 375/219, 229, 232, 257, 285, 295, 296; 370/282, 284
See application file for complete search history.

(56) References Cited

U.S. PATENT DOCUMENTS

| | | | | |
|---|---|---|---|---|
| 9,240,912 B1 * | 1/2016 | Giridharan | H03F 3/45659 | |
| 2013/0163126 A1 * | 6/2013 | Dong | G06F 13/4086 | 361/56 |
| 2018/0069712 A1 * | 3/2018 | Gaade | H03F 3/45085 | |
| 2020/0145263 A1 * | 5/2020 | Gotz | G06F 13/40 | |
| 2023/0253975 A1 * | 8/2023 | Hsieh | H03M 1/0863 | 341/144 |

FOREIGN PATENT DOCUMENTS

| | | |
|---|---|---|
| KR | 10-2021-0063011 A | 6/2021 |
| KR | 10-2023-0030803 A | 3/2023 |

* cited by examiner

[FIG 1]

[FIG 3A]
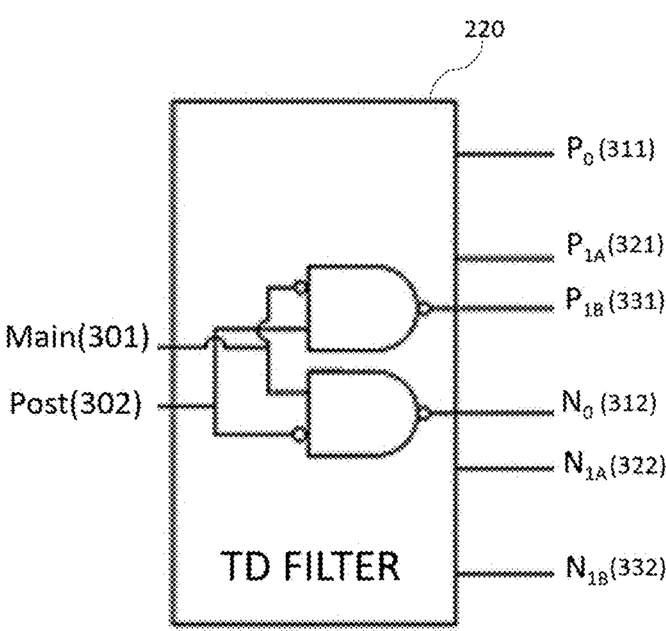

FIG. 5

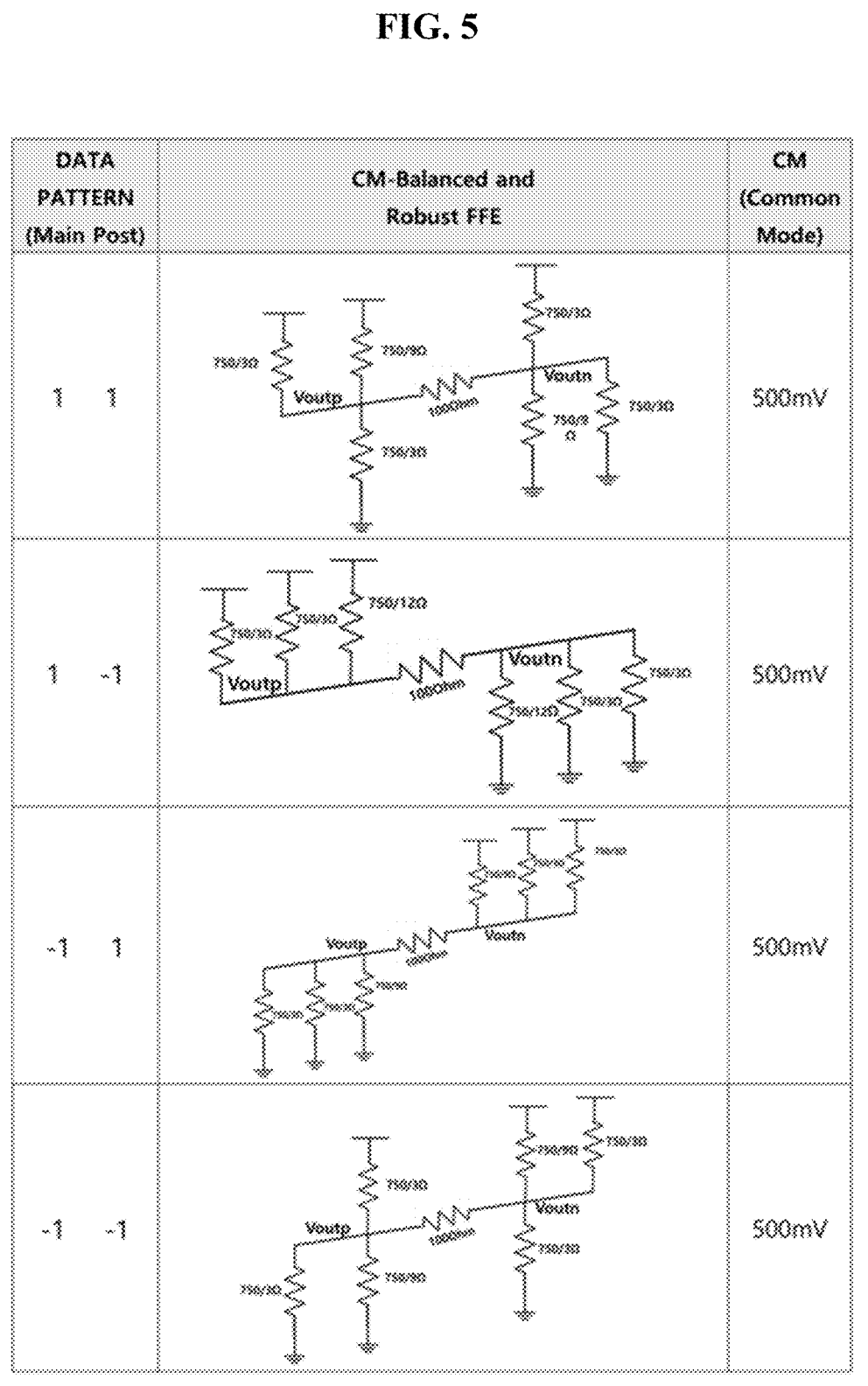

| DATA PATTERN (Main Post) | CM-Balanced and Robust FFE | CM (Common Mode) |
|---|---|---|
| 1 1 | Voutp Voutn 100Ohm | 500mV |
| 1 -1 | Voutp Voutn 100Ohm | 500mV |
| -1 1 | Voutp Voutn 100Ohm | 500mV |
| -1 -1 | Voutp Voutn 100Ohm | 500mV |

TRANSMITTER COMPRISING FEED FORWARD EQUALIZER

CROSS REFERENCE TO RELATED APPLICATIONS

This application is a National Stage of International Application No. PCT/KR2023/004322 filed Mar. 30, 2023, claiming priority based on Korean Patent Application No. 10-2022-0040923 filed Apr. 1, 2022.

TECHNICAL FIELD

The present invention relates to a transmitter comprising a feed forward equalizer. More specifically, the present invention relates to a transmitter comprising a feed forward equalizer capable of stably transmitting a signal while maintaining a common mode voltage stably and being less affected by coefficient errors.

BACKGROUND ART

As the processing capability of digital computing engines improves and technologies utilizing interconnected networks are developed, ultra-high-speed mass data transmission technologies have become necessary, and high-speed serial link circuit structures are being used for this purpose.

High-speed serial link circuits can have low-pass characteristics because they include RC channels made of resistance or capacitance, etc. For example, when a signal passes through an RC channel, high-frequency components of the signal can be attenuated, and inter-symbol interference (ISI) can occur as the pulse width widens.

Recently, technologies that reduce data loss and distortion due to inter-signal interference have emerged, and a representative example is equalization. For example, feed forward equalization (FFE) is a channel compensation method widely used in high-speed interconnects of baseband.

The feed forward equalizer operates in the transmitter by generating a delayed signal of multiple input signals and adding an appropriate coefficient to it to the input signal, which can reduce the distortion of data passing through the channel. However, the feed forward equalizer may have coefficient error due to the dispersion characteristics of transistors.

The proposed circuit to improve this problem is the coefficient error robust feed forward equalizer (Coefficient Robust FFE). The coefficient error robust feed forward equalizer applies a transition detection (TD) filter to reduce signal distortion caused by coefficient error, thereby improving the robustness against coefficient errors.

However, the coefficient error robust feed forward equalizer may have different common mode voltages depending on the pattern of data. For example, a common mode voltage difference may occur when there is a transition between the input signal and the delay signal and when there is no transition, and the common mode voltage difference may burden the CTLE of the receiver. For example, there is a problem that the linearity of the CTLE of the transmitter decreases when receiving data, which may cause additional distortion and burden at the receiver.

DISCLOSURE

Technical Problem

Therefore, the transmitter comprising a feed forward equalizer according to one embodiment is an invention designed to solve the above-described problem, and the purpose thereof is to provide a transmitter comprising a feed forward equalizer capable of stably transmitting a signal while maintaining a common mode voltage stably and being less affected by a coefficient error.

More specifically, the transmitter comprising a feed forward equalizer according to one embodiment provides a technology capable of maintaining a common mode voltage difference constant when there is a transition between an input signal and a delay signal and when there is no transition, thereby providing a transmitter capable of having robustness against a coefficient error.

Technical Solution

A transmitter comprising a feed forward equalizer according to an embodiment of present invention comprises a delay unit receiving an input signal and generating at least one delay signal, a transition detection filter generating an input data information based on the input signal and the at least one delay signal, a transition information for the input signal and the at least one delay signal, and a common mode balancing information for the transition information and a voltage driver outputting a differential transmission signal based on the input data information, the transition information, and the common mode balancing information.

The input data information, the transition information, and the common mode balancing information are composed of a pair of signals.

The transition information and the common mode balancing information are composed of a pair of opposing signals when the input data information composed of the pair of signals is identical to each other.

The transition information and the common mode balancing information are composed of a pair of same signals when the input data information composed of the pair of signals are different from each other.

The common mode balancing information creates a pull up path that adjusts the driver slice of the voltage driver.

A system for high-speed interconnect according to another embodiment of present invention comprises a transmitter including a feed forward equalizer, a receiver and a channel connecting the transmitter and the receiver, wherein the transmitter includes a delay unit which receives an input signal and generates at least one delay signal, a transition detection filter which generates an input data information based on the input signal and the at least one delay signal, a transition information for the input signal and the at least one delay signal, and a common mode balancing information for the transition information and a voltage driver which outputs a differential transmission signal based on the input data information, the transition information, and the common mode balancing information.

The input data information, the transition information, and the common mode balancing information are composed of a pair of signals.

The transition information and the common mode balancing information are composed of a pair of opposing signals when the input data information composed of the pair of signals is identical to each other.

The transition information and the common mode balancing information are composed of a pair of same signals when the input data information composed of the pair of signals are different from each other.

The common mode balancing information creates a pull up path that adjusts the driver slice of the voltage driver.

Advantageous Effects

A transmitter comprising a feed forward equalizer according to one embodiment can output a complete differential signal by controlling a signal so that a common mode voltage can be maintained constant.

In addition, a transmitter comprising a feed forward equalizer according to one embodiment can reduce distortion and burden occurring in the CTLE of the transmitter while having robustness against coefficient errors.

The effects of the present invention are not limited to the technical problems mentioned above, and other effects not mentioned will be clearly understood by those skilled in the art from the descriptions below.

BRIEF DESCRIPTION OF DRAWINGS

To more fully understand the drawings cited in the detailed description of the present invention, a brief description of each drawing is provided.

FIGS. 3A and 3B are diagrams showing a transition detection filter according to various embodiments.

FIG. 5 is a diagram showing a simplified circuit diagram of a driver and a common mode voltage when a data pattern changes according to various embodiments.

MODES OF THE INVENTION

Figure 1:
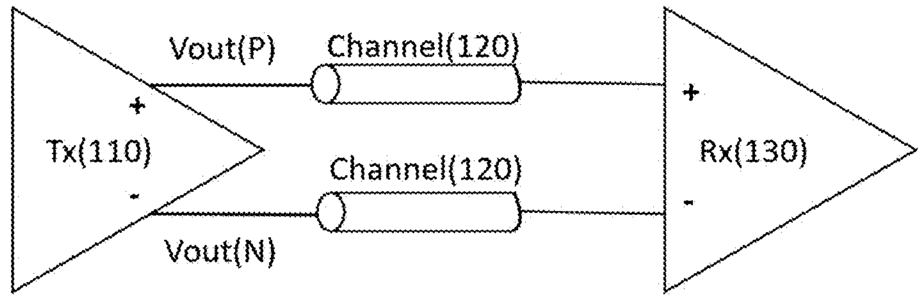
FIG. 1 is a conceptual diagram of a high-speed interconnect system including a feedforward equalizer according to various embodiments.

Hereinafter, embodiments according to the present invention will be described with reference to the attached drawings. When adding reference signs to components in each drawing, it should be noted that the same components are given the same signs as much as possible even if they are shown in different drawings. In addition, when describing embodiments of the present invention, if it is determined that a specific description of a related known configuration or function hinders the understanding of the embodiments of the present invention, the detailed description thereof will be omitted. In addition, although embodiments of the present invention will be described below, the technical idea of the present invention is not limited or restricted thereto and may be modified and implemented in various ways by those skilled in the art. In addition, the terms used in this specification are used to describe embodiments and are not intended to limit and/or restrict the disclosed invention. The singular expression includes the plural expression unless the context clearly indicates otherwise. In this specification, terms such as "include", "comprise" or "have" are intended to indicate the presence of a feature, number, step, operation, component, part or combination thereof described in the specification, but do not preclude the possibility of the presence or addition of one or more other features, numbers, steps, operations, components, parts or combinations thereof.

In addition, throughout the specification, when a part is said to be "connected" to another part, this includes not only the case where it is "directly connected" but also the case where it is "indirectly connected" with another element in between, and terms including ordinal numbers such as "first", "second", etc. used in this specification may be used to describe various components, but the components are not limited by the terms.

Below, embodiments of the present invention will be described in detail with reference to the attached drawings so that those skilled in the art can easily practice the present invention. In addition, parts unrelated to the description are omitted in the drawings to clearly describe the present invention.

FIG. 1 is a conceptual diagram of a high-speed interconnect system 100 including a feedforward equalizer according to various embodiments.

Referring to FIG. 1, a general system for a high-speed interconnect 100 may be configured to include a transmitter 110, a channel 120, and a receiver 130.

According to various embodiments, the channel 120 may include a coaxial cable, a backplane, a PCB, a package, and on-chip wires, and the length of the channel 120 may range from several centimeters to several tens of meters.

When the data rate is in the range of several Gb/s to several tens of Gb/s, the channel 120 has the characteristics of a low-pass filter (LPF) and inter-symbol interference (ISI) may occur.

When the channel loss is large at the Nyquist frequency, the signal-to-signal interference seriously interferes with communication.

For example, it is known that when the channel loss is 0 to 10 dB, the loss is small, when it is 10 to 20 dB, the loss is large, and when it is 20 to 30 dB, the loss is very large. To secure reliability under such an environment, the transmitter 110 may include a feed forward equalizer (FFE). The feed forward equalizer (FFE) may be used to secure a data rate by compensating for the channel loss.

Figure 2:
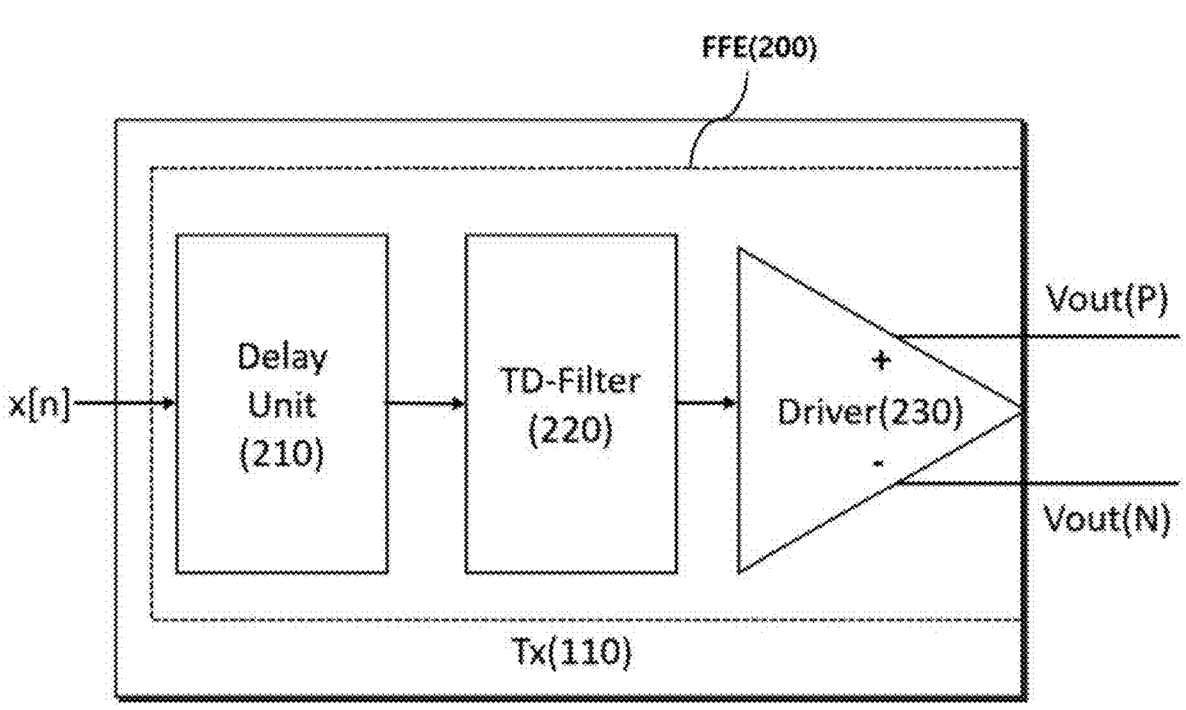
FIG. 2 is a block diagram showing the structure of a transmitter including a feedforward equalizer according to various embodiments.

FIG. 2 is a block diagram showing the structure of a transmitter 110 including a feed forward equalizer according to various embodiments.

Referring to FIG. 2, the transmitter 110 including a feed forward equalizer FFE) 200, wherein the feed forward equalizer 200 may include a delay unit 210, a transition detection filter 220, and a voltage driver 230.

According to various embodiments, the delay unit 210 may receive an input signal (x[n]) and generate at least one delay signal.

The input signal (x[n]) may be composed of input data (x) according to an integer time index (n). The input signal (x[n]) is a transmitted data sequence, and the signal level may have a value of 1 (bit '1') or −1 (bit '0').

According to various embodiments, the delay unit 210 may be composed of one or more according to the number of taps and may be connected in series with each other. For example, the coefficient of the taps may be 2 to 5, and one or more delay units 210 may be connected in series with each other.

Meanwhile, although this specification describes a 2-tap structure including one delay unit for convenience, it is not intended to limit the scope of the rights of this document to this, and the number of taps may be expanded and implemented according to the purpose.

According to various embodiments, the transition detection filter 220 can generate input data information based on the input signal and the at least one delay signal, transition information for the input signal and the at least one delay signal, and common mode balancing information for the transition information.

Figure 3B:
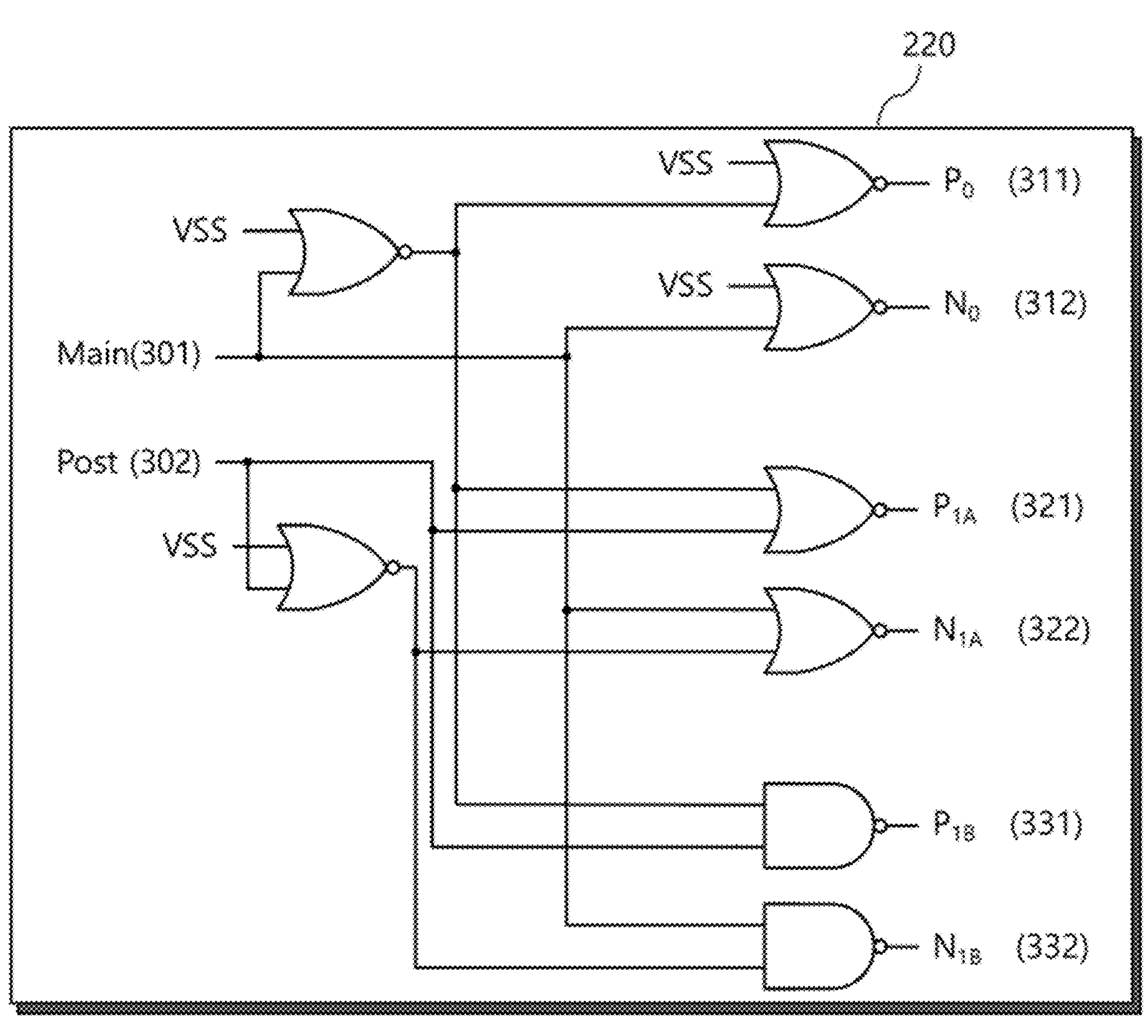

FIGS. 3A and 3B are diagrams illustrating a transition detection filter 220 according to various embodiments.

Referring to FIGS. 3A and 3B, a transition detection filter 220 of a 2-tap feed forward equalizer is illustrated, and the transition detection filter 220 can receive an input signal 301 and a delay signal 302 as input signals. Although not illustrated, a feed forward equalizer including two or more delay units can transmit an input signal 301 and a plurality of delay signals 302 to the transition detection filter 220.

The transition detection filter 220 can generate common mode balancing information 331, 332 by calculating the input signal 301 and the delay signal 302, respectively.

The common mode balancing information 331, 332 can perform a role of constantly matching the common mode voltage value when the transition occurs by creating a pull up path that adjusts the driver slice of the voltage driver 230 when the transition of the input signal 301 and the delay signal 302 does not occur, for example.

When there is a transition of the input signal 301 and the delay signal 302, the common mode balancing information 331, 332 can have a value opposite to the transition information 321, 322, thereby maintaining the common mode voltage constant.

Table 1 shows input data information 311, 312, transition information 321, 322, and common mode balancing information 331, 332 according to the data pattern of the input signal 301 and the delay signal 302.

TABLE 1

| 301 | 302 | 311 | 321 | 331 | 312 | 322 | 332 |
|---|---|---|---|---|---|---|---|
| 1 | 1 | 1 | −1 | 1 | −1 | −1 | 1 |
| 1 | −1 | 1 | 1 | 1 | −1 | −1 | −1 |
| −1 | 1 | −1 | −1 | −1 | 1 | 1 | 1 |
| −1 | −1 | −1 | −1 | 1 | 1 | −1 | 1 |

Referring to Table 1, it can be confirmed that when a transition occurs (when the input signal 301 and the delay signal 302 are equal as ‘1’ or ‘−1’), the transition information 321, 322 is not configured as a complete differential signal. At this time, it can be confirmed that the common mode balancing information 331, 332 configures a complete differential signal by outputting a value opposite to the transition information 321, 322.

For example, when the input signal 301 and the delay signal 302 are ‘1’, the transition information 321, 322 each have ‘−1’, but since the common mode balancing information 331, 332 each output ‘1’, a complete differential signal can be configured overall.

As another example, when the input signal 301 and the delay signal 302 are ‘−1’, the transition information 321, 322 each has ‘−1’, but the common mode balancing information 331, 332 outputs ‘1’, so that the entirety constitutes a complete differential signal.

When no transition occurs (when the input signal 301 and the delay signal 302 are different from each other as ‘1’ or ‘−1’), the transition information 321, 322 is constituted as a complete differential signal, so that the common mode balancing information 331, 332 can also output a complete differential signal. In this case, the common mode balancing information 331, 332 can play a role of constantly matching the common mode voltage value when the transition occurs by creating a pull-up path that adjusts the driver slice of the voltage driver 230.

According to various embodiments, when there are multiple delay units 210, the transition detection filter 220 may be placed between any two adjacent delay units 210 among the multiple delay units 210, placed in front of the most advanced delay unit 210 that receives the input signal (x[n]), or placed in the back of the last delay unit 210.

According to various embodiments, the voltage driver 230 may output a differential transmission signal Vout(P), Vout(N) based on the input data information, the transition information, and the common mode balancing information.

The voltage driver 230 may be configured to include the same number of driver slices as the number of driver slices of a conventional voltage driver. For example, if a conventional voltage driver that is a reference includes a total of 15 driver slices, the voltage driver 230 of the present invention may be configured to include a total of 15 driver slices.

More specifically, if a conventional voltage driver includes a total of 9 driver slices connected to input data information and a total of 6 driver slices connected to transition information, the voltage driver 230 according to various embodiments of the present invention may be configured with a total of 15 driver slices, including 9 driver slices connected to input data information, 3 driver slices connected to input data information, and 3 driver slices connected to common mode balancing information.

As another example, if a conventional voltage driver includes 11 driver slices connected to input data information and a total of 4 driver slices connected to transition information, the voltage driver 230 according to various embodiments of the present invention may be configured with a total of 15 driver slices, including 11 driver slices connected to input data information, 2 driver slices connected to input data information, and 2 driver slices connected to common mode balancing information.

Figure 4A:
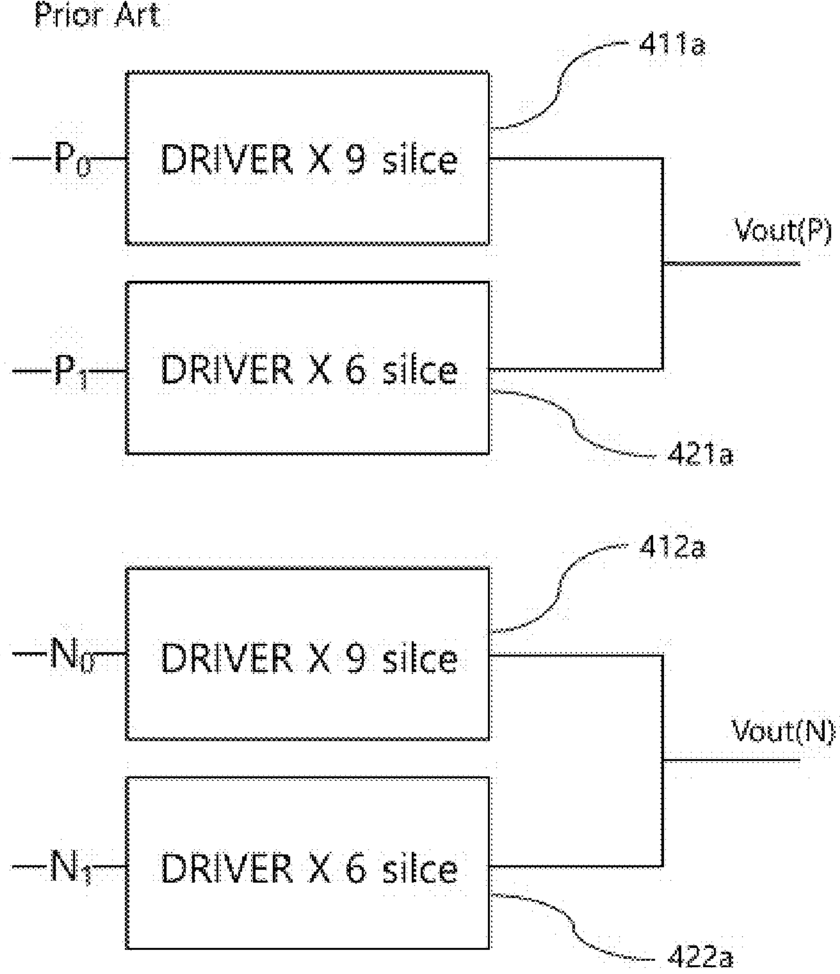
FIGS. 4A and 4B are diagrams showing a voltage driver according to various embodiments.
Figure 4B:
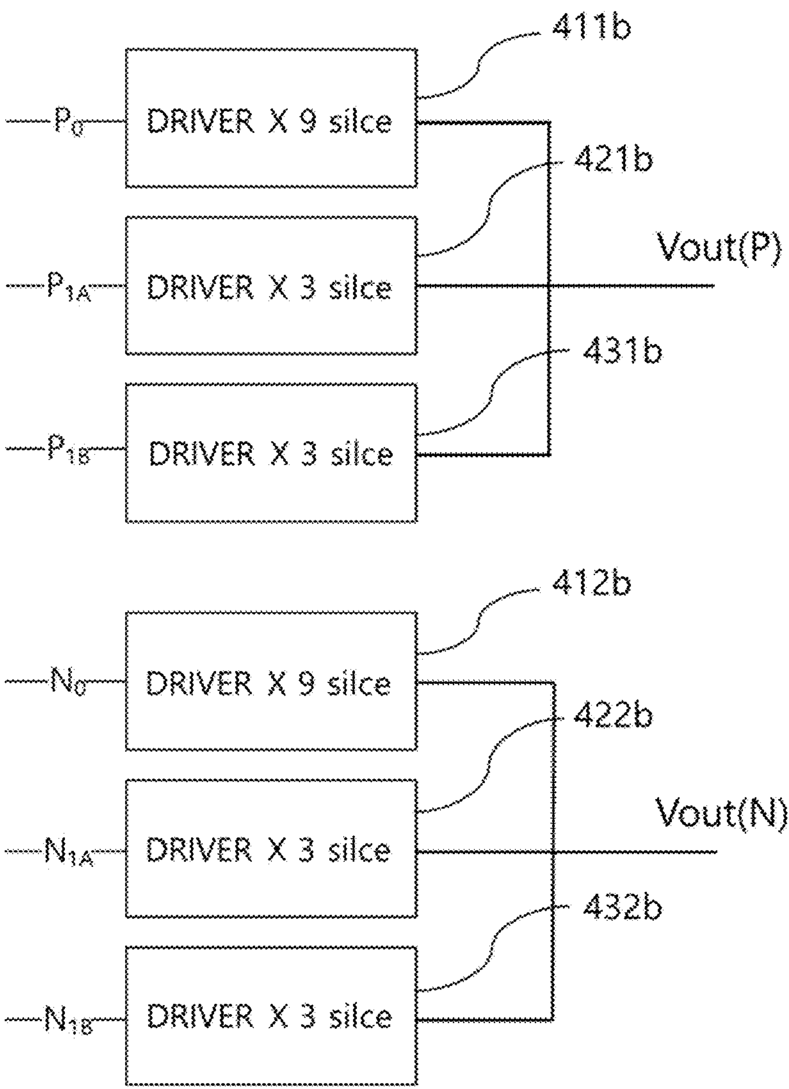

FIGS. 4A and 4B are diagrams illustrating voltage drivers according to various embodiments.

Referring to FIG. 4A, a conventional voltage driver is illustrated.

For example, a conventional driver may include 9 driver slices in a first tap 411*a*, 412*a* connected to input data information, and 6 driver slices in a second tap 421*a*, 422*a* connected to transition information.

In the following description, it is assumed that the output impedance of 1 slice is 750Ω for impedance matching. For example, in FIG. 4A, 15 driver slices are connected in parallel to each of the differential transmission signals Vout(P), Vout(N), and each may be assumed to have an output impedance of 750/15=50Ω.

Referring to FIG. 4B, a voltage driver according to various embodiments of the present invention is illustrated.

For example, the driver may include 9 driver slices in the first tap 411*b*, 412*b* connected to input data information, 3 driver slices in the second tap 421*b*, 422*b* connected to transition information, and 3 driver slices in the third tap 431*b*, 432*b* connected to common mode balancing information.

15 driver slices are connected in parallel to each of the differential transmission signals Vout(P), Vout(N), and each may have an output impedance of 750/15=50Ω.

In conclusion, the voltage driver of the present invention includes the same number of driver slices as the number of driver slices of a conventional voltage driver, and although no additional circuit is added, it can output common mode balancing information, so that the common mode voltage can be maintained constant.

FIG. 5 is a simplified circuit diagram of the driver and a diagram showing common mode voltage when a data pattern changes according to various embodiments.

Referring to Table 1, when the data pattern of the input signal and the delay signal is (1, 1), it is confirmed that P0=1, P1A=−1, P1B=1, N0=−1, N1A=−1, N1B=1. And it can be assumed that when the data level is '1', the PMOS of the voltage driver is 'on', and when the data level is '−1', the NMOS is 'on'. In other words, when the data pattern is (1, 1), a total of 12 (3+9) PMOS are 'on' on the Vout(P) side, and 3 NMOS are 'on'.

Vout(N) also operates in the same way as the explained logic, and when calculating Vout(P) and Vout(N) (resistance-voltage division law), they are 0.35V and 0.65V, respectively. In conclusion, it can be confirmed that the common mode voltage is 0.5*(0.35+0.65)=0.5V.

In this way, it can be confirmed that the common mode voltage is constant at 0.5V even when calculating not only the case where the data pattern is (−1, −1) but also the case where the data pattern is (1, −1) and (−1, 1). As a result, it can be confirmed that the differential transmission signal according to the present invention is configured as a complete differential.

Figure 6:
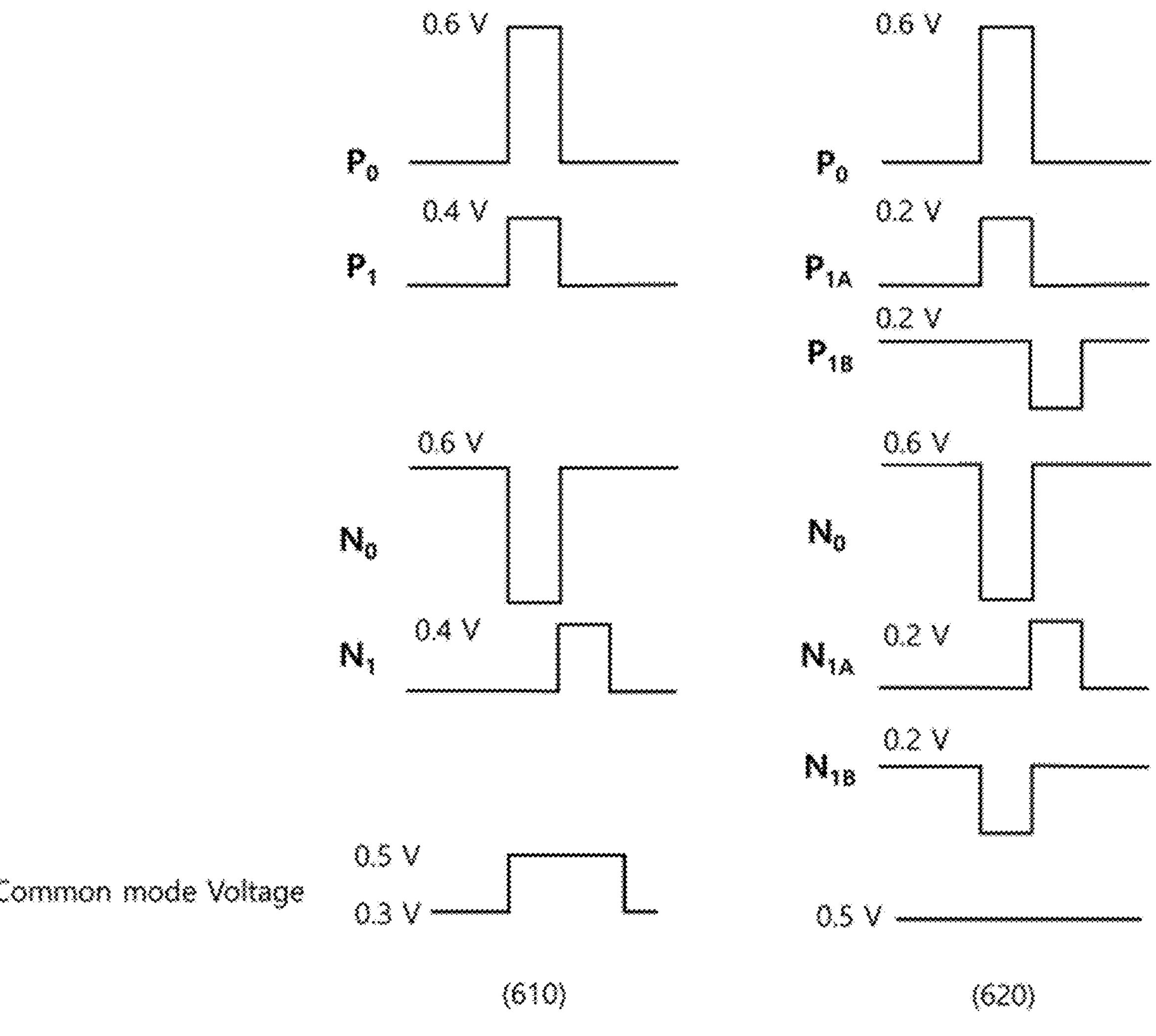
FIG. 6 is a diagram showing a differential signal of the present invention compared to a prior art according to various embodiments.

FIG. 6 is a diagram showing the differential signal of the present invention according to various embodiments compared to the prior art.

Referring to FIG. 6, it can be confirmed that the differential signal 610 according to the prior art shows a partial differential.

For example, the input data information P0, N0 shows a complete differential signal form that becomes '0' when added together, but the transition information P1, N1 shows an incomplete differential signal form when added together, so it can generate a common mode voltage. According to the prior art, the common mode voltage can continuously vary depending on whether the input signal and the delay signal are transitioned. If the common mode voltage varies, the linearity of the CTLE of the transmitter decreases when receiving data, which may cause additional distortion and burden at the receiver.

On the other hand, the differential signal 620 according to the present invention shows complete differential. For example, the input data information P0, N0 shows a complete differential signal form that becomes '0' when added together and can also show a complete differential signal form that becomes '0' when both the transition information P1A, NIB and the common mode balancing information P2A, N2B are added together.

According to the present invention, since the common mode voltage continues to be the same regardless of whether the input signal and the delay signal are transitioned, distortion at the receiver and the burden can be reduced.

Figure 7A:
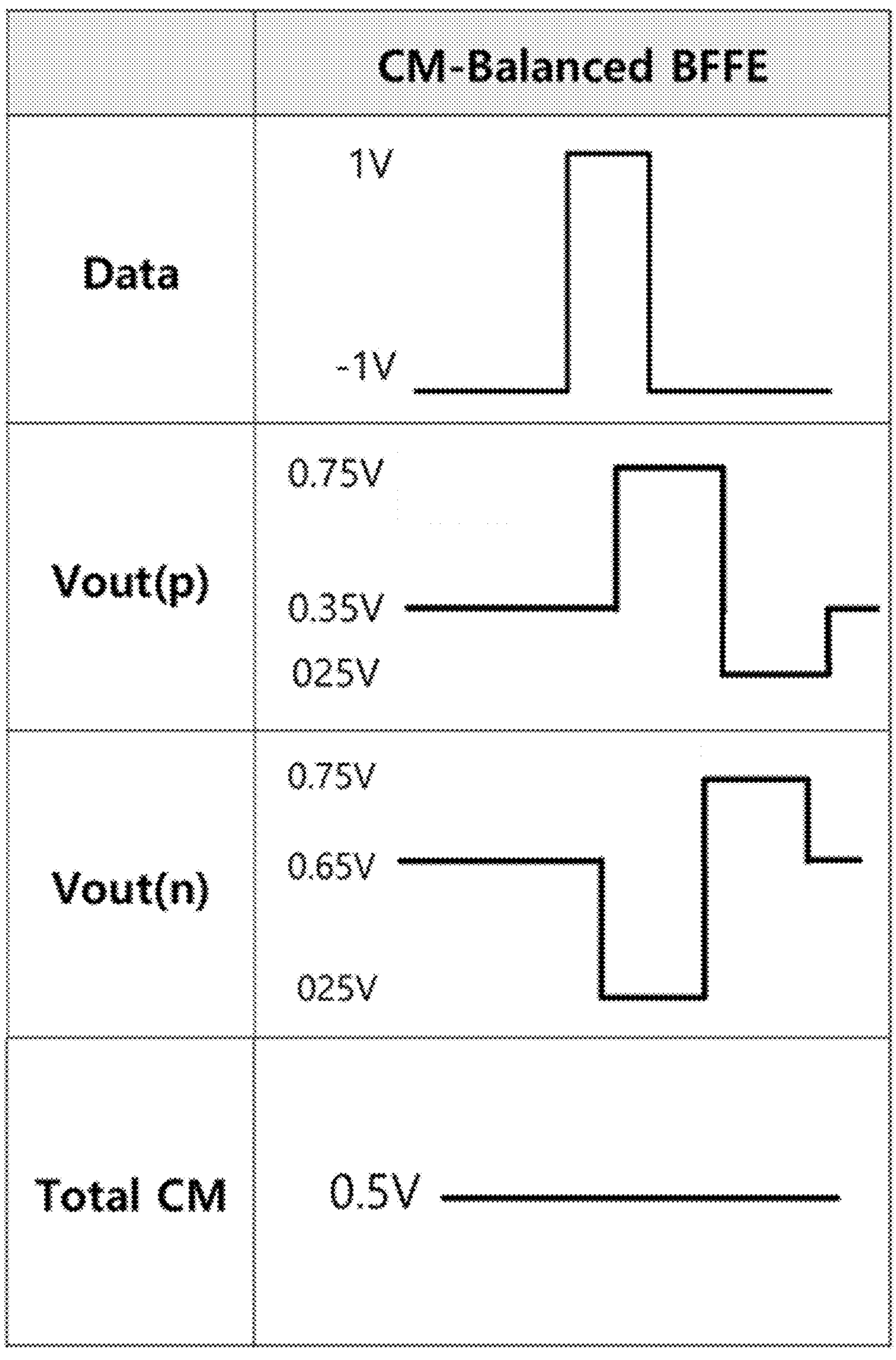
FIGS. 7A and 7B are diagrams showing a change in a common mode voltage according to various embodiments of the present invention.
Figure 7B:
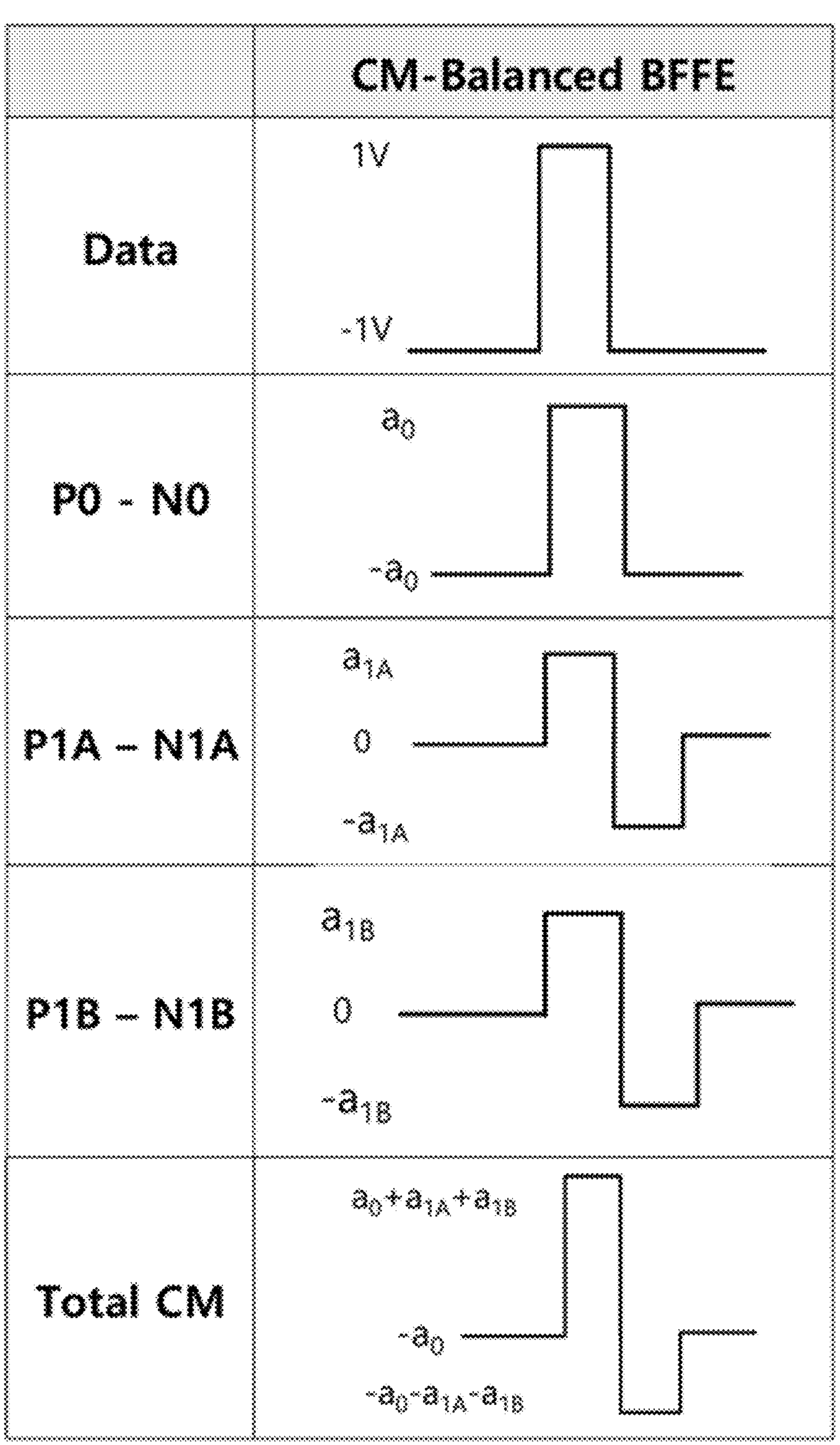

FIGS. 7A and 7B are diagrams showing changes in common mode voltage according to various embodiments of the present invention.

Referring to FIGS. 7A and 7B, the common mode voltage is maintained constant even when a transition occurs. For example, the feed forward equalization of the present invention maintains the characteristics of a conventional coefficient error robust feed forward equalizer in which the high frequency components corresponding to the errors of a1A and a1B increase after passing through the transition detection filter and are added in a direction that compensates for a0. Here, a0, a1A, and a1B represent the coefficients of P0, N0 and PIA, NIA and P1B, NIB, respectively. However, unlike the conventional coefficient error robust feed forward equalizer, the present invention has the characteristic that the common mode voltage is always maintained regardless of the data pattern.

Up to now, we have investigated the configuration and operating principle of a transmitter comprising a feed forward equalizer according to one embodiment in detail through the drawings.

A transmitter comprising a feed forward equalizer according to one embodiment can output a complete differential signal by controlling a signal so that a common mode voltage can be maintained constant.

In addition, a transmitter comprising a feed forward equalizer according to one embodiment can reduce distortion and burden occurring in the CTLE of the transmitter while being robust to coefficient errors.

The devices described above can be implemented by hardware components, software components, and/or a combination of hardware components and software components. For example, the devices and components described in the embodiments can be implemented using one or more general-purpose computers or special-purpose computers, such as, for example, a processor, a controller, an arithmetic logic unit (ALU), a digital signal processor, a microcomputer, a field programmable array (FPA), a programmable logic unit (PLU), a microprocessor, or any other device capable of executing instructions and responding to them. The processing device can execute an operating system (OS) and one or more software applications running on the operating system. In addition, the processing device can access, store, manipulate, process, and generate information in response to the execution of the software. For ease of understanding, the processing unit is sometimes described as being used alone, but those skilled in the art will recognize that the processing unit may include multiple processing elements and/or multiple types of processing elements. For example, the processing unit may include multiple processors, or a processor and a controller. Other processing configurations, such as parallel processors, are also possible.

The software may include computer programs, code, instructions, or a combination of one or more of these, and may configure the processing unit to operate as desired or may individually or collectively command the processing unit. The software and/or information may be embodied in any type of machine, component, physical device, virtual equipment, computer storage medium, or device for interpretation by the processing unit or for providing instructions or information to the processing unit. The software may be distributed over networked computer systems and stored or executed in a distributed manner. The software and information may be stored on one or more computer-readable recording media.

The method according to the embodiment may be implemented in the form of program commands that can be executed through various computer means and recorded on a computer-readable medium. Examples of the computer-readable recording medium include magnetic media such as hard disks, floppy disks, and magnetic tapes, optical media such as CD-ROMs and DVDs, magneto-optical media such as floptical disks, and hardware devices specifically configured to store and execute program commands such as ROMs, RAMs, flash memories, etc. Examples of the program commands include not only machine language codes generated by a compiler, but also high-level language codes that can be executed by a computer using an interpreter, etc.

Although the embodiments have been described by limited embodiments and drawings as described above, those skilled in the art will appreciate that various modifications and variations can be made from the above description. For example, suitable results may be achieved even if the described techniques are performed in a different order than the described method, and/or components of the described systems, structures, devices, circuits, etc. are combined or combined in a different manner than the described method or are replaced or substituted by other components or equivalents. Therefore, other implementations, other examples, and equivalents of the claims are also within the scope of the following claims.

The invention claimed is:

1. A transmitter comprising a feed forward equalizer, the feed forward equalizer comprising:

a delay unit receiving an input signal and generating at least one delay signal;

a transition detection filter generating an input data information based on the input signal and the at least one delay signal, a transition information for the input signal and the at least one delay signal, and a common mode balancing information for the transition information; and a voltage driver outputting a differential transmission signal based on the input data information, the transition information, and the common mode balancing information.

2. The transmitter according to claim 1, wherein the input data information, the transition information, and the common mode balancing information are composed of a pair of signals.

3. The transmitter according to claim 2, wherein the transition information and the common mode balancing information are composed of a pair of opposing signals when the input data information composed of the pair of signals is identical to each other.

4. The transmitter according to claim 2, wherein the transition information and the common mode balancing information are composed of a pair of same signals when the input data information composed of the pair of signals are different from each other.

5. The transmitter according to claim 4, wherein the common mode balancing information creates a pull up path that adjusts the driver slice of the voltage driver.

6. A system for high-speed interconnect comprising:

a transmitter including a feed forward equalizer;

a receiver; and a channel connecting the transmitter and the receiver;

wherein the feed forward equalizer comprises:

a delay unit which receives an input signal and generates at least one delay signal;

a transition detection filter which generates an input data information based on the input signal and the at least one delay signal, a transition information for the input signal and the at least one delay signal, and a common mode balancing information for the transition information; and a voltage driver which outputs a differential transmission signal based on the input data information, the transition information, and the common mode balancing information.

7. The system according to claim 6, wherein the input data information, the transition information, and the common mode balancing information are composed of a pair of signals.

8. The system according to claim 7, wherein the transition information and the common mode balancing information are composed of a pair of opposing signals when the input data information composed of the pair of signals is identical to each other.

9. The system according to claim 7, wherein the transition information and the common mode balancing information are composed of a pair of same signals when the input data information composed of the pair of signals are different from each other.

10. The system according to claim 9, wherein the common mode balancing information creates a pull up path that adjusts the driver slice of the voltage driver.

* * * * *